US009250781B2

(12) United States Patent
Abdukalykov et al.

(10) Patent No.: US 9,250,781 B2
(45) Date of Patent: Feb. 2, 2016

(54) METHOD AND DEVICE FOR NAVIGATING TIME AND TIMESCALE USING MOVEMENTS

(71) Applicant: SAP SE, Walldorf (DE)

(72) Inventors: Rolan Abdukalykov, Montreal (CA); Roy Ghorayeb, Montreal (CA); Mohannad El-Jayousi, L'Ile-Bizard (CA); Alain Gauthier, Montreal (CA); Xuebo Liang, Brossard (CA); Vincent Lavoie, Montreal (CA)

(73) Assignee: SAP SE, Walldorf (DE)

( * ) Notice: Subject to any disclaimer, the term of this patent is extended or adjusted under 35 U.S.C. 154(b) by 64 days.

(21) Appl. No.: 13/654,102

(22) Filed: Oct. 17, 2012

(65) Prior Publication Data

US 2014/0104158 A1 Apr. 17, 2014

(51) Int. Cl.
*G06F 3/0485* (2013.01)
*G06Q 10/10* (2012.01)
*H04M 1/725* (2006.01)

(52) U.S. Cl.
CPC ............ *G06F 3/0485* (2013.01); *G06Q 10/109* (2013.01); *H04M 1/72566* (2013.01); *H04M 2250/12* (2013.01); *H04M 2250/22* (2013.01)

(58) Field of Classification Search
CPC . G06F 1/1626; G06F 3/04886; G06F 3/0488; G06F 3/038; G06F 3/048; G06F 17/30696; G06F 2200/1637; G06F 3/0346; G06F 1/1613; G06F 3/04883; G06F 3/017; G06F 1/1694; G06F 3/0485; G06Q 30/0267; G06Q 10/109–10/1097; H04M 1/72566
See application file for complete search history.

(56) References Cited

U.S. PATENT DOCUMENTS

| 5,323,314 | A | 6/1994 | Baber et al. |
| 5,745,110 | A | 4/1998 | Ertemalp |
| 5,867,163 | A | 2/1999 | Kurtenbach |
| 5,898,431 | A | 4/1999 | Webster et al. |
| 6,054,989 | A | 4/2000 | Robertson et al. |
| 6,201,554 | B1 * | 3/2001 | Lands ........................ 345/169 |
| 6,380,953 | B1 | 4/2002 | Mizuno |
| 6,674,450 | B1 | 1/2004 | Toub et al. |
| 6,915,490 | B1 | 7/2005 | Ewing |

(Continued)

FOREIGN PATENT DOCUMENTS

| AU | 2011101579 A4 | 2/2012 |
| EP | 1696301 A1 | 8/2006 |

(Continued)

OTHER PUBLICATIONS

"Active Knowledge Modeling—Architect Your Business—12 Different Ways to Model Business Processes," http://activeknowledgemodeling.com/2009/03/31/12-different-ways-to-model-business-processes/, Mar. 31, 2009, 8 pages.

(Continued)

*Primary Examiner* — Sanjiv D Patel
(74) *Attorney, Agent, or Firm* — Kenyon & Kenyon LLP

(57) ABSTRACT

A portable electronic device including a calendar application operable to display a calendar application at a first time and first timescale as well as a second time and second timescale different from the first time and first timescale, and an input unit operable to detect a movement of the portable electronic device, wherein the calendar application proceeds to the second time or second timescale from the first time or first timescale upon detection of the movement.

21 Claims, 4 Drawing Sheets

(56) References Cited

U.S. PATENT DOCUMENTS

| | | | |
|---|---|---|---|
| 7,050,056 B2 | 5/2006 | Meyringer | |
| 7,168,045 B2 | 1/2007 | Fliess et al. | |
| 7,225,285 B1 | 5/2007 | Fairman et al. | |
| 7,340,484 B2 | 3/2008 | S et al. | |
| 7,421,645 B2 | 9/2008 | Reynar | |
| 7,546,577 B2 | 6/2009 | Do et al. | |
| 7,603,381 B2 | 10/2009 | Burke et al. | |
| 7,739,695 B2 | 6/2010 | Wood et al. | |
| 7,908,584 B2 | 3/2011 | Singh et al. | |
| 8,024,666 B2 | 9/2011 | Thompson | |
| 8,191,003 B2 | 5/2012 | Brown et al. | |
| 8,214,748 B2* | 7/2012 | Srikanth et al. | 715/751 |
| 8,402,480 B2 | 3/2013 | Rohwer | |
| 8,788,303 B1* | 7/2014 | Krone et al. | 705/5 |
| 8,812,546 B1 | 8/2014 | Cornali | |
| 2001/0042059 A1 | 11/2001 | Uehara et al. | |
| 2002/0091586 A1 | 7/2002 | Wakai et al. | |
| 2002/0130899 A1 | 9/2002 | Ryan et al. | |
| 2002/0158969 A1 | 10/2002 | Gupta | |
| 2003/0066032 A1 | 4/2003 | Ramachandran et al. | |
| 2003/0120621 A1 | 6/2003 | McDaniel et al. | |
| 2003/0160815 A1* | 8/2003 | Muschetto | 345/733 |
| 2003/0182210 A1 | 9/2003 | Weitzman et al. | |
| 2003/0229848 A1 | 12/2003 | Arend et al. | |
| 2004/0252134 A1 | 12/2004 | Bhatt et al. | |
| 2005/0050010 A1 | 3/2005 | Linden | |
| 2005/0144038 A1 | 6/2005 | Tamblyn et al. | |
| 2005/0171410 A1 | 8/2005 | Hjelt et al. | |
| 2005/0197998 A1* | 9/2005 | Asbury | 707/1 |
| 2005/0262452 A1 | 11/2005 | Sauermann | |
| 2005/0278217 A1 | 12/2005 | Adams et al. | |
| 2005/0278354 A1 | 12/2005 | Gupta et al. | |
| 2005/0278372 A1 | 12/2005 | Shaburov et al. | |
| 2005/0289202 A1 | 12/2005 | S et al. | |
| 2006/0036568 A1 | 2/2006 | Moore et al. | |
| 2006/0069666 A1 | 3/2006 | Burke et al. | |
| 2006/0089877 A1 | 4/2006 | Graziano et al. | |
| 2006/0206522 A1 | 9/2006 | Austin et al. | |
| 2006/0238538 A1 | 10/2006 | Kapler et al. | |
| 2006/0242121 A1 | 10/2006 | DeVorchik et al. | |
| 2006/0268742 A1 | 11/2006 | Chu et al. | |
| 2007/0064022 A1 | 3/2007 | Silverbrook et al. | |
| 2007/0156430 A1 | 7/2007 | Kaetker et al. | |
| 2007/0180377 A1 | 8/2007 | Gittelman et al. | |
| 2007/0199006 A1 | 8/2007 | Mukundan et al. | |
| 2007/0211056 A1 | 9/2007 | Chakraborty et al. | |
| 2007/0219842 A1 | 9/2007 | Bansal et al. | |
| 2007/0233539 A1 | 10/2007 | Suenderhauf et al. | |
| 2007/0239351 A1 | 10/2007 | Sherrill et al. | |
| 2007/0244875 A1 | 10/2007 | Bodin et al. | |
| 2007/0268246 A1* | 11/2007 | Hyatt | 345/156 |
| 2007/0288283 A1 | 12/2007 | Fitzpatrick | |
| 2008/0040684 A1 | 2/2008 | Crump | |
| 2008/0077549 A1 | 3/2008 | Glania et al. | |
| 2008/0114625 A1* | 5/2008 | Kline et al. | 705/7 |
| 2008/0120129 A1 | 5/2008 | Seubert et al. | |
| 2008/0141142 A1* | 6/2008 | Lyle et al. | 715/751 |
| 2008/0148190 A1 | 6/2008 | Schaff | |
| 2008/0163125 A1 | 7/2008 | Gu et al. | |
| 2008/0163126 A1 | 7/2008 | Rao | |
| 2008/0168397 A1 | 7/2008 | Nelson | |
| 2008/0178101 A1 | 7/2008 | Rode et al. | |
| 2008/0178500 A1 | 7/2008 | Teuteberg | |
| 2008/0195969 A1 | 8/2008 | Brown et al. | |
| 2008/0221946 A1 | 9/2008 | Balon | |
| 2008/0294994 A1 | 11/2008 | Kruger et al. | |
| 2008/0307314 A1 | 12/2008 | Cisler et al. | |
| 2008/0307323 A1 | 12/2008 | Coffman et al. | |
| 2008/0313005 A1 | 12/2008 | Nessland et al. | |
| 2008/0319818 A1 | 12/2008 | Gurdin et al. | |
| 2008/0320558 A1 | 12/2008 | Imanishi et al. | |
| 2009/0049372 A1 | 2/2009 | Goldberg | |
| 2009/0076878 A1 | 3/2009 | Woerner et al. | |
| 2009/0158173 A1 | 6/2009 | Palahnuk et al. | |
| 2009/0174680 A1 | 7/2009 | Anzures et al. | |
| 2009/0254370 A1 | 10/2009 | Kondo et al. | |
| 2009/0254597 A1 | 10/2009 | Karoji | |
| 2009/0293074 A1* | 11/2009 | Rohwer | 719/328 |
| 2009/0313268 A1 | 12/2009 | Folting et al. | |
| 2010/0030783 A1 | 2/2010 | Ho et al. | |
| 2010/0099462 A1* | 4/2010 | Baek et al. | 455/566 |
| 2010/0131889 A1 | 5/2010 | Helmolt et al. | |
| 2010/0138334 A1 | 6/2010 | Warsaw et al. | |
| 2010/0145936 A1 | 6/2010 | Grinstein et al. | |
| 2010/0251954 A1 | 10/2010 | Yamada | |
| 2010/0318640 A1 | 12/2010 | Mehta et al. | |
| 2010/0325582 A1 | 12/2010 | Bansal et al. | |
| 2010/0333014 A1 | 12/2010 | Fritzley et al. | |
| 2011/0029521 A1 | 2/2011 | Thayne et al. | |
| 2011/0072394 A1 | 3/2011 | Victor | |
| 2011/0078016 A1 | 3/2011 | Wagenblatt et al. | |
| 2011/0078058 A1 | 3/2011 | Wagenblatt et al. | |
| 2011/0078171 A1 | 3/2011 | Wagenblatt et al. | |
| 2011/0087708 A1 | 4/2011 | Teichmann et al. | |
| 2011/0099500 A1 | 4/2011 | Smith et al. | |
| 2011/0153629 A1 | 6/2011 | Lehmann et al. | |
| 2011/0157005 A1 | 6/2011 | Inoue | |
| 2011/0167369 A1 | 7/2011 | van Os | |
| 2011/0167382 A1 | 7/2011 | van Os | |
| 2011/0179368 A1 | 7/2011 | King et al. | |
| 2011/0269435 A1 | 11/2011 | Dieckman | |
| 2011/0276351 A1 | 11/2011 | Kondo et al. | |
| 2011/0283242 A1 | 11/2011 | Chew et al. | |
| 2011/0289422 A1 | 11/2011 | Spivack et al. | |
| 2011/0298830 A1 | 12/2011 | Lam | |
| 2012/0011426 A1 | 1/2012 | Yach | |
| 2012/0032877 A1* | 2/2012 | Watkins et al. | 345/156 |
| 2012/0036091 A1 | 2/2012 | Cook | |
| 2012/0036485 A1* | 2/2012 | Watkins et al. | 715/863 |
| 2012/0079408 A1 | 3/2012 | Rohwer | |
| 2012/0105484 A1* | 5/2012 | Cui | 345/660 |
| 2012/0117493 A1 | 5/2012 | Gu et al. | |
| 2012/0131496 A1 | 5/2012 | Goossens et al. | |
| 2012/0174013 A1 | 7/2012 | Kraus et al. | |
| 2012/0198369 A1 | 8/2012 | Sorin et al. | |
| 2012/0253869 A1 | 10/2012 | Ansley | |
| 2012/0284637 A1 | 11/2012 | Boyer et al. | |
| 2012/0304121 A1 | 11/2012 | Cahill et al. | |
| 2012/0311475 A1 | 12/2012 | Wong | |
| 2013/0038625 A1 | 2/2013 | Nakajima | |
| 2013/0074003 A1 | 3/2013 | Dolenc | |
| 2013/0085961 A1 | 4/2013 | Naghshin et al. | |
| 2013/0144880 A1 | 6/2013 | Kemmer et al. | |
| 2013/0290340 A1 | 10/2013 | Suermondt et al. | |
| 2013/0321340 A1 | 12/2013 | Seo et al. | |
| 2014/0036639 A1* | 2/2014 | Boni et al. | 368/29 |
| 2014/0109015 A1 | 4/2014 | Farn | |
| 2014/0225897 A1* | 8/2014 | Sarrazin et al. | 345/467 |

FOREIGN PATENT DOCUMENTS

| | | |
|---|---|---|
| EP | 1837736 A2 | 9/2007 |
| EP | 2330470 A1 | 6/2011 |
| JP | 2009050937 A | 3/2009 |

OTHER PUBLICATIONS

"Layer Container," http://homepage.mac.com/dlemmermann/DLSC/manual/components/layercontainer/layercontainer.html, 2007, 2 pages.
IBM TDB and Torres, R.J. "Zooming on Visual Calendar Data," IPCOM Prior Art Database, http://ip.com/IPCOM/000121803, Sep. 1, 1991, 2 pages.
Burigat et al., "Visualizing references to off-screen content on mobile devices: A comparison of Arrows, Wedge, and Overview + Detail," Interacting With Computers, 2011 Elsevier B.V., pp. 156-166.
Google: "Android 2.3.4 User's Guide," googleusercontent.com, May 20, 2011, Retrieved on Oct. 10, 2013 from the Internet: URL:http://static.googleusercontent.com/external_content/untrusted_dlcp/www.google.com/en/help/hc/pdfs/mobile/AndroidUsersGuide-2.3.4.pdf.
SEAVUS Project Viewer 4.1, User Manual, 2009—Section 3.7 (groups) 3.6 (filters).

(56) References Cited

OTHER PUBLICATIONS

Anonymous: "Google Calendar—Revision as of 16:55, Apr. 17, 2012," pp. 1-7, Gustavus Adolphus College, retrieved from the Internet: URL:https://gustavus.edu/gts/w/index.php?title=Google_Calendar&oldid=24920 [retrieved on Jan. 10, 2014].

Arsanjani, Ali, "Rule Object 2001: A Pattern Language for Adaptive and Scalable Business Rule Construction", IBM National EAD Center of Competency [online], [retrieved on May 16, 2014], Retrieved from the Internet (URL: http://citeseerx.ist.psu.edu/viewdoc/download?doi=10.1.1.202.6970&rep=rep1&type=pdf), 2001.

Office Action, dated Feb. 4, 2015, from EP Application No. 13178606.3 filed Jul. 30, 2013.

Tri-State Tree View Control for .NET 1.1—Code Project, Dec. 14, 2007, 10 pages, http://www.codeproject.com/Articles/22116/Tri-State-Tree-View-Control-for-NET.

Telerik XAMLflix Tree View- Part 4: Implement a Tri-state CheckBox Using MVVM, YouTube video published Apr. 24, 2012 with 7 screenshots, https://www.youtube.com/watch?v=xlyj7-kv7_w.

Tri-State Tree View Control—CodeProject, Nov. 2, 2005, 7 pages, http://www.codeproject.com/Articles/6549/Tri-State-TreeView-Control.

Tri-State Tree View- CodeProject, May 30, 2011, 17 pages, http://www.codeproject.com/Articles/202435/Tri-State-Tree-View.

\* cited by examiner

METHOD AND DEVICE FOR NAVIGATING TIME AND TIMESCALE USING MOVEMENTS

BACKGROUND

The present invention relates to electronic calendar applications, and more particularly, to mobile electronic calendar applications that enable a user to navigate the time and timescale illustrated by a calendar display in response to user movements of a portable electronic device.

Advances in computing technologies have enabled smaller devices, such as mobile phones and tablets, to execute more sophisticated applications. As a result, users are able to perform many of the functions on their mobile phones and tablets that they previously performed on their personal computers and laptops. For example, users are now able to view websites, e-mail, and calendars on their mobile phones and tablets.

A drawback of smaller devices is their reduced display size. In order to maximize the display size of these smaller devices, touch screen interfaces are often used. The use of a touch screen eliminates the need for a separate keypad such that additional space can be dedicated to a display. In addition, touch screens eliminate the need for a pointer object (e.g., arrow or cursor) within the display. Although touch screens help to maximize display size on mobile phones and tablets, their small displays still present challenges to application developers.

Calendar entries may include dense amounts of information. Such information is easier to view and comprehend when viewed on the larger screen sizes that are typically found on desktop monitors and laptops. The much smaller screens on mobile phones and tablets make it difficult for a user to quickly find, navigate, and comprehend the dense information that may be included in some calendar applications.

For example, when opening a calendar timeline interface, a user initially views a time position (e.g., certain time and/or date) and may navigate in time from that time position. There are several ways to navigate a calendar application such as triggering a search, opening a calendar entry, or clicking on a particular date. Unfortunately, there is no method that allows a user to navigate a calendar based on detected movements of a portable electronic device. Thus, there is a need for a more navigable mobile calendar application that easily allows a user to navigate time position (i.e., hour, day, week, month, and year).

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
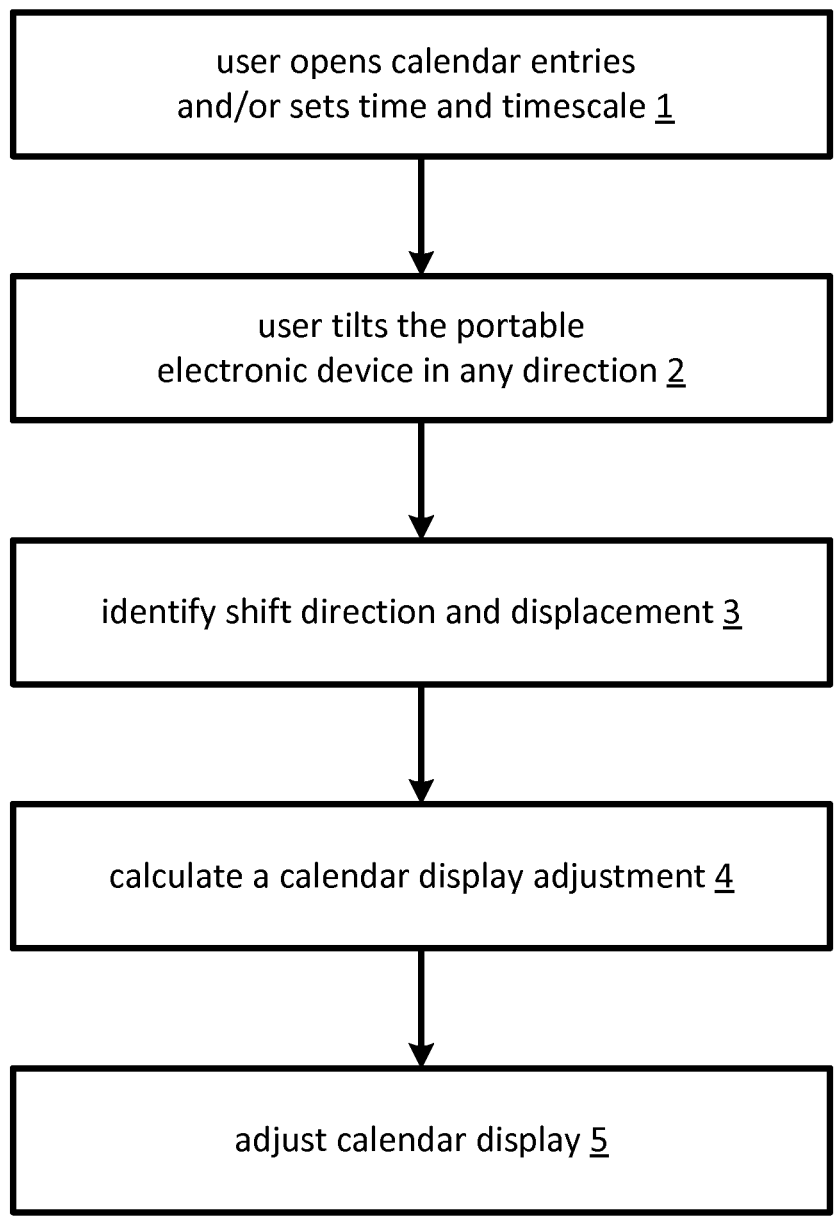
FIG. 1 illustrates a method for navigating the time and timescale illustrated by a calendar display according to an example embodiment of the present invention.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Embodiments of user interfaces and associated methods for using a device are described. In some embodiments, the device is a portable communication device (e.g., a mobile phone or tablet). The user interface may include a touch screen, a gyroscopic or other acceleration device, and/or other input/output devices. In the discussion that follows, a portable communications device is used as an example embodiment. It should be understood, however, that the user interfaces and associated methods may be applied to other devices, such as personal computers and laptops, that may include one or more other physical user-interface devices, such as a keyboard and or mouse.

The portable communication device may support a variety of applications, such as telephone, text messenger, and calendar applications. The various applications that may be executed on the device may use at least one common physical user-interface device, such as a touch screen. One or more functions of the touch screen as well as corresponding information displayed on the device may be adjusted and/or varied from one application to another and/or within a respective application. In this way, a common physical architecture of the device may support a variety of applications with user interfaces that are intuitive and transparent. In the discussion that follows, a calendar application is used as an exemplary embodiment, but it should be understood that the user interfaces and associated methods may be applied to other applications.

A calendar application that allows a user to navigate time position and timescale is provided. In addition to using finger gestures on a touch screen to change a time position and timescale, tilts and other movements of the portable electronic device may be detected and used to navigate a calendar application. In particular, a user may navigate a calendar application by moving the host portable electronic device. For example, a user may navigate to an earlier or later time position by tilting the portable electronic device to the left or right side, respectively. In another example, a user may shuffle through entries within a specified time range by moving the portable electronic device up or down. Alternatively, a user may zoom in and out of the timescale by moving the portable electronic device down or up, respectively. In yet another example, a motion on the touch screen or sequence on a keypad (or other tactile device), may also be applied to navigate time position and timescale in a calendar application.

A user viewing calendar content may vary the timescale. Using a user-interface of the portable communication device, a user may change the timescale. In the case of a touch screen, the timescale may be changed according to a change of a distance separating two user selected points on the screen as at least one of the user selected points is moved by the user. In the case of an acceleration device, the timescale may be changed according to detected variations in tilt or device height. As the user zooms into and out of the timeline, a timescale that is displayed as part of the timeline may also be updated. For example, if a user zooms into a particular timescale showing several years worth of data in the timeline, the timescale may be updated to show fiscal quarters or calendar months instead of years. The entries that are shown in the timeline may also be updated so that they correspond to the selected zoomed in time period. A user using a touch screen device may use at least two of their fingers to select and/or move the two points on the touch screen.

In some instances, detailed information may be displayed for calendar entries when a user zooms into the timeline whereas aggregated, consolidated, or more general information may be displayed when the user zooms out of the timeline. In some instance, the degree of zooming may depend on the separation distance between the two user selected points as the user moves one of the points. Alternatively, the degree of zooming may also depend on the detected change in the height of the portable electronic device, and zooming in may be achieved by moving the portable electronic device in the downward direction. In both instances, the calendar may be further zoomed into making it possible to zoom from displaying several years, to displaying only a few months, to only a few days, and so on by either spreading the two points further apart or moving them closer together. The reverse zoom may also be applied if the points are moved in the opposite direction by either moving them closer together or spreading them apart. Reverse zoom may also be achieved by detecting a move of the portable electronic device in an upward direction.

FIG. 1 illustrates a method for navigating the time and timescale illustrated by a calendar display according to an example embodiment of the present invention.

At step 1, a user opens a calendar application at a time position and timescale. Examples of the initial time position include today's date or the last date viewed by the user. In yet another example, the initial time position may be the time and timescale viewed when the calendar is opened via another application such as e-mail. Similarly, the initial timescale may be a day, week, or the timescale last viewed by the user. As described below, the calendar application may depict a timeline with a primary timescale (e.g., years) and a more granular secondary timescale (e.g., months). Calendar entries occurring within the depicted time period are displayed by the calendar application. As desired, the user may add, remove, or modify calendar entries.

Initially, the calendar application may require that a user provide a login name and login password to access the calendar. The login name and login password may then be used to identify individual users associated with a calendar. Optionally, the calendar application may be linked to an e-mail application such that calendar entries may also be added via the e-mail application.

At step 2, the user tilts the portable electronic device in any direction. For example, the user may tilt the portable electronic device to the left by an angle X. Alternatively, a rapid change in the vertical position of the portable electronic device may signify a user's desire to zoom in or out of the displayed timescale. In yet another alternative, a user may shuffle through entries within a specified time range by moving the portable electronic device up or down (e.g., closer to a user's face or the ground).

Next, at step 3, the calendar application identifies the shift direction (e.g., right, left, up, down) and displacement (i.e., degree of change). Variations to the shift direction and device displacement may be collectively referred to as "shift." Included within the portable electronic device is a gyroscopic or other acceleration device that can be used to detect changes in the device's shift direction and displacement. Alternatively, the shift can be determined using input parameters. Although some input parameters may originate from a gyroscopic device, other input parameter may be used as well. For example, input parameters may include a calculated shift angle and/or calculated height difference between the center of the portable electronic devices and the lowest edge.

At step 4, a calendar display adjustment is calculated based on the detected shift direction and displacement. The calendar display adjustment can be calculated in three steps. First, a shift factor is calculated. For example, the shift factor may be determined by dividing the shift displacement by the width of the calendar display if the shift is in the horizontal direction. Similarly, the shift factor may be determined by dividing the shift displacement by the height of the calendar display if the shift is in the vertical direction. Second, the shift factor may be multiplied by a factor representing a number of days or number of entries to determine a change to the number of days or entries illustrated by the calendar application. Third, the result can be compared to a threshold, and updates to the time position and/or timescale may be triggered when the predetermined threshold has been bypassed.

The calendar application may also include a preferences menu that enables a user to define customized thresholds with conditions when they may be applied. Alternatively, the calendar application may provide some pre-defined thresholds that may also be applied by a user. If desired, a threshold may be applicable for certain types of calendar entries. For example, the threshold applied when viewing a specific entry may be different than the threshold used when viewing a monthly calendar. In another example, a user may desire to use the motion features to navigate the timescale, but not to navigate individual entries. In yet another example, the threshold may be applied to navigate between multiple applications. In this last example, if a user opens another application, such as e-mail, via the calendar, a motion may be detected and compared to a threshold to return to the calendar application.

The step of setting one or more customized thresholds may be performed initially when installing or first using the calendar application. Afterwards, a user may change the thresholds, as desired.

Lastly, at step 5, the user display of the calendar application is updated to display the adjusted time position and timescale. The timescale (i.e., primary and secondary) of the calendar application is adjusted to reflect a user's desired start and end dates. Optionally, the calendar application may check whether the start date or end date of the updated timescale deviates from a customized threshold (e.g., original timescale). If the user navigates too much, the start and end dates of the calendar application can be readjusted to the original dates or set to minimal date range. The minimal date range can be customized to include any number of days as desired. Thus, a calendar application that allows a user to easily navigate a calendar application through movements to the portable electronic device is provided.

Accordingly, a calendar application that allows a user to navigate time position and timescale by moving a portable electronic device is provided. The user navigates the calendar causing the time and timescale illustrated by a calendar display to change. Typically, a user can open the calendar application to view and/or and modify (add, delete, change, etc.) one or more calendar entries of the electronic calendar. In addition, after opening the calendar application, a user may navigate the calendar and vary the timescale illustrated by the calendar application. For example, a user may desire to view several entries that are scattered in time. In the case of a touch screen, the time shown may be changed by sliding a point or finger across the timeline illustrated on the screen. Similarly, the timescale may be changed according to a change of a distance separating two user selected points on the screen as at least one of the user selected points is moved by the user. In the case of an acceleration device, the time position may be changed according to detected variations in tilt. Similarly, the timescale may be changes by varying the device height. As the user zooms into and out of the timeline, a timescale that is displayed as part of the timeline may also be updated.

Figure 2:
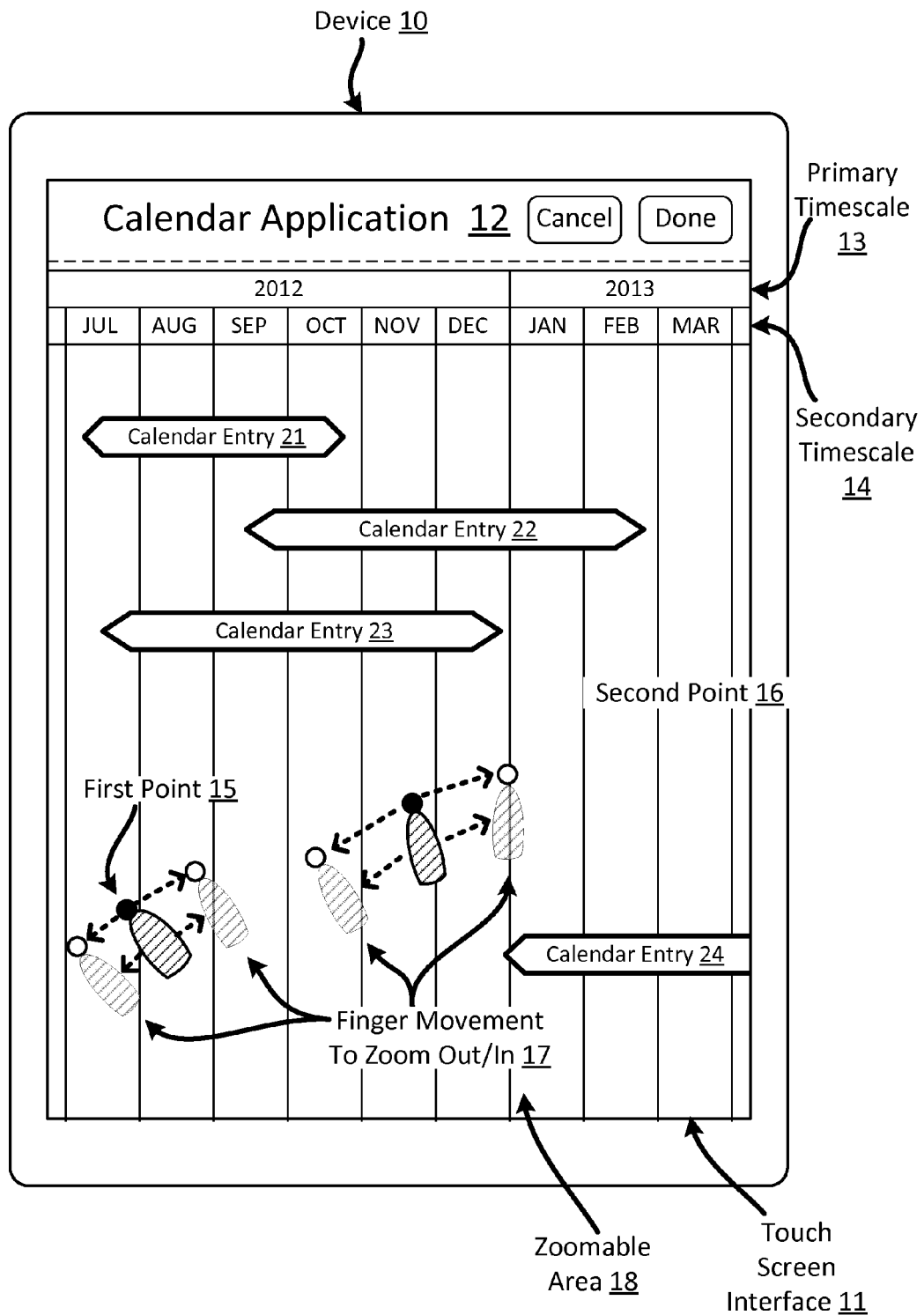
FIG. 2 illustrates a representative view of a portable electronic device having a calendar application according to an example embodiment of the present invention.

FIG. 2 illustrates a representative view of a portable electronic device having a calendar application according to an example embodiment of the present invention. As shown in FIG. 2, a portable electronic device 10 includes a touch screen interface 11 and calendar application 12 displayed thereon.

The calendar application 12 may show a horizontal timeline with a primary timescale 13 and a secondary timescale 14. The calendar application 12 may include a zoomable area 18 which may encompass the whole timeline or parts of the timeline where the user may use their fingers 17 or other objects to zoom in or out of the timeline. The calendar application 12 may also display calendar entries 21 to 24 that fall within the time periods displayed within the timeline.

A user may zoom in or out of the timeline by initially selecting first and second points 15 and 16 on the timeline with their fingers or another object. The user may then drag one or more of their fingers to change the distance between the first point 15 and the second point 16. The change in the distance separating the two points may determine whether to zoom in or out of the timeline and by what amount. Alternatively, the user may zoom in or out of the timeline by varying the height of the portable electronic device 10, as detected by a built-in acceleration device. Similarly, the time position may be changed by tilting the portable electronic device 10.

In some instances, whenever the timeline is readjusted, the calendar entries and/or other content associated with the timeline may also be reassessed for display in the timeline. In addition to changing the background image, the entries may be resized according to the zoom level and/or a different number of entries may be displayed to make the entries more readable and/or selectable by a user.

Figure 3:
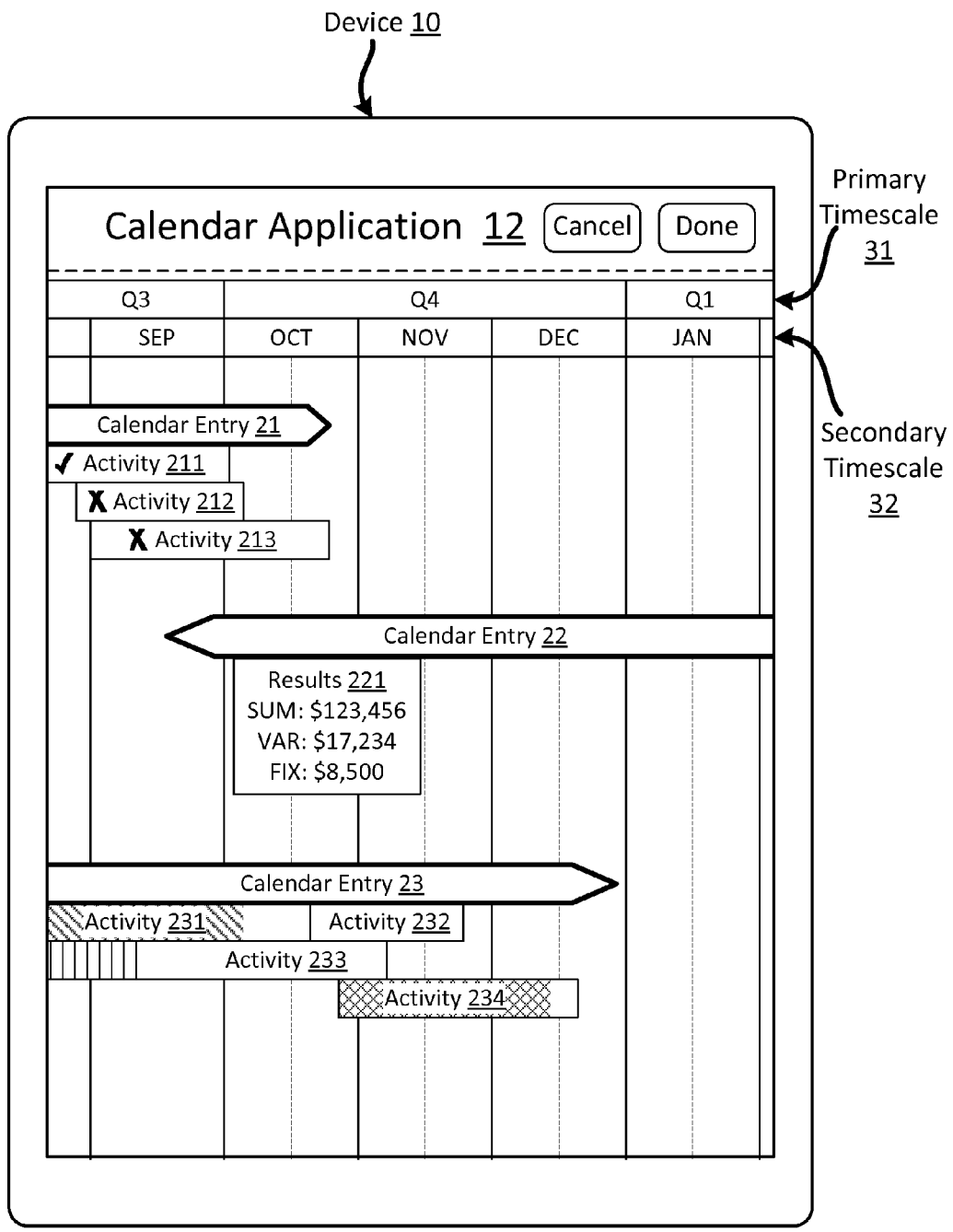
FIG. 3 illustrates another representative view of a portable electronic device having a calendar application according to an example embodiment of the present invention.

FIG. 3 illustrates another representative view of a portable electronic device having a calendar application according to an example embodiment of the present invention. As compared to FIG. 2, a shorter timeline is depicted in FIG. 3. In other words, FIG. 3 shows a zoomed in view of the calendar application of FIG. 2. The view of FIG. 2 shows a timeline between July 2012 and March 2013, whereas the zoomed in view in FIG. 3 shows a timeline between September 2012 and January 2013.

When zooming into or out of the timeline, a timescale shown in the timeline displayed across a first dimension may be changed based on the adjusted start and end dates of the timeline. For example, in FIG. 2 the primary timescale 13 displays years, whereas the primary timescale 31 in FIG. 3 displays quarters (instead of years).

The timescale shown in the timeline may be a multidimensional timescale including a primary timescale 13 and 31 and a secondary timescale 14 and 32. The secondary timescale 14 and 32 may have a unit of time that is a subset of the primary timescale 13 and 31. When a multidimensional timescale is changed, at least one of the primary timescale 13 and 31 and the secondary timescale 14 and 32 may be changed accordingly. For example, the primary timescale 31 may be fiscal quarters and the secondary timescale 32 may be months. When zooming out of this calendar view, the primary timescale may change from fiscal quarters 31 to years 13, as shown when zooming out of FIG. 3 to return to the view of FIG. 2.

In some instances, the secondary timescale may be changed between different time units, such as from months to quarters. In other instances, the secondary timescale may continue to show the same time unit, such as months 14 and 32, though the space allocated for time unit may be changed, such as the space allocated for each month on the screen being reduced when zooming out from FIG. 3 to FIG. 2 and the space allocated being increased when zooming in from FIG. 2 to FIG. 3.

When zooming into or out of the calendar application 12, either or both of the primary timescale 13 and 31 and the secondary timescale 14 and 32 may be changed. In addition, the information about one or more of the calendar entries displayed on the screen may also change when zooming into or out of the calendar application 12. For example, in response to a user zooming into the timeline, additional information associated with each calendar entry may be displayed on the screen. This additional information may be displayed for those calendar entries that are within the adjusted start date and the adjusted end date of the timeline.

The additional information that is displayed may include any information about the activities, tasks, or events associated with a respective calendar entry. In some situations, the displayed additional information may include one or more sub-activity completion status bars 211 to 213. These status bars 211 to 213 may list one or more activities associated with a calendar entry 21 and show a status of the activity, for example, with a check mark or cross, so that a user can quickly identify a status of each activity. As the user further zooms into the calendar application 12, further information about each activity may be displayed, such as sub-activities status bars for each sub-activity associated with an activity. In some instances, the sub-activity status bars may be positioned in the calendar application 12 so that they are aligned with a start, end, or other date associated with the activity. A customized sequence may be used, for example, to return to a calendar entry view from an activity or sub-activity view.

In some situations, the displayed additional information may include statistical information 221 about a respective calendar entry. The statistical information 221 may, but need not, be limited to data included between the adjusted start date and the adjusted end date of the timeline as shown in the zoomed in timeline. The statistical information 221 may include a function, such as a sum, variance, or other function, that is applied to data associated with the calendar entry in order to generate the displayed statistical information 221. As the user further zooms into the calendar application 12, further details about the activity and/or the statistical information 221 may be displayed. By zooming out, a user may return to a calendar entry view from a view in which statistical information is displayed.

In some situations, the displayed additional information may include one or more sub-activity progress bars 231 to 234. These progress bars 231 to 234 may be aligned in the calendar application with a start date and an end date of an activity associated with a respective calendar entry 23. A progress bar (shown in hatching) may show an overall completion amount of each activity. Progress bars of contingent activities 231 and 232 may be aligned on a same row. As the user further zooms into the calendar application 12, further details about the activity and/or the completion status of the progress bars 231 to 234 may be displayed. Again, by zooming out, a user may return to a calendar entry view from an activity or sub-activity view.

Information displayed on screen may also be consolidated if the user zooms out of the calendar application 12. For example, in response to a user zooming out of the timeline, calendar entry information displayed on screen may be consolidated to display less information on the screen.

Figure 4:
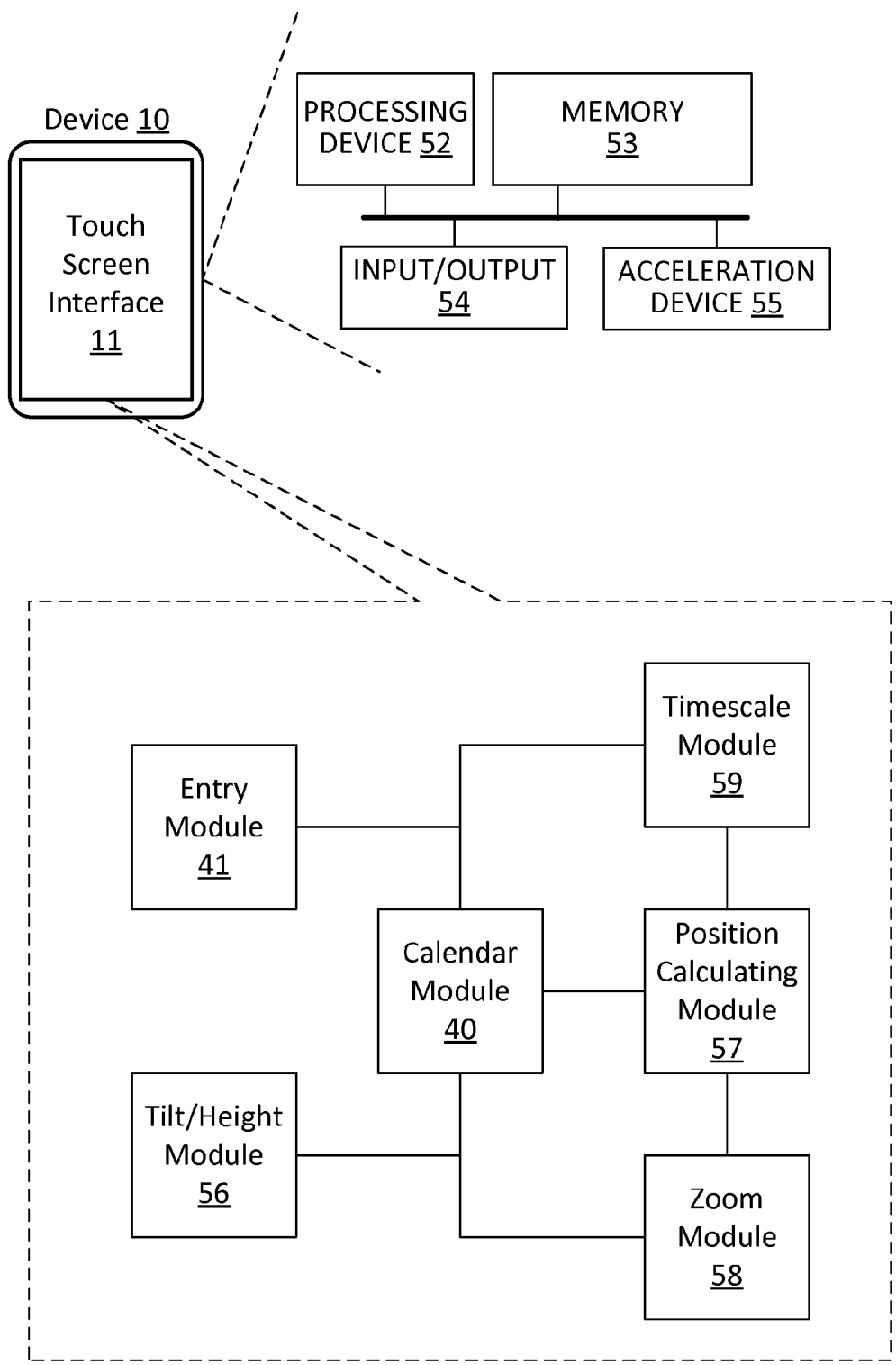
FIG. 4 illustrates a representative architecture of a portable electronic device according to an example embodiment of the present invention.

FIG. 4 illustrates a representative architecture of a portable electronic device according to an example embodiment of the present invention.

A portable electronic device 10 may include a touch screen interface 11, processing device 52, memory 53, communications interface 54, and acceleration device 55. The touch screen interface 11 may include a display, which may be a touch screen, capable of displaying data to a user of the portable electronic device 10.

Although not shown, the touch screen may include a sensor that may be a capacitive touch detection sensor, configured to detect and track movement on the surface and/or in the vicinity of the display. The sensor may be coupled to a signal processing circuit that is configured to identify, locate, and/or track object movement based on the data obtained from sensor.

Portable electronic device 10 may also include a calendar application module 40 that generally implements the functionality of an electronic calendar. Calendar application module 40 may be coupled to other modules including calendar entry module 41, tilt and height module 56, position calculating module 57, zoom module 58, and a timescale module 59. Each of the modules may be part of the calendar application, or alternatively, may be part of another application and accessed by the calendar application. For example, the position calculating module 57 is coupled to zoom module 58, both of which may be shared by a variety of applications using the touch screen interface 11.

Memory 53 may include a computer readable medium storing application modules, which may include instructions associated with applications and modules of the portable electronic device 10.

Tilt and height module 56 may include a gyroscopic or other acceleration device that identifies the shift direction (e.g., right, left, up, down) and displacement (i.e., degree of change). Tilt and height module 56 is operable to detect changes in the device's shift direction and displacement, scaling the detected a scaling factor that varies for different units of time in the calendar application, and dividing the scaled calculated change in distance by the width of the displayed timeline and by an adjustment factor to calculate a date change amount. In addition, the tilt and height module 56 can be used to perform related calculations, such as the shift angle and/or the height difference between the center of the portable electronic devices and the lowest edge.

The position calculation module 57 may include functionality for identifying a touched first point and second point within a calendar application displaying a timeline across a first dimension on the touch screen device 10. The position calculation module 57 may also include functionality for calculating a change in a distance between the first point and the second point in response to a dragging of at least one of the touched points, scaling the calculated change in distance with a scaling factor that varies for different units of time in the calendar application, and dividing the scaled calculated change in distance by the width of the displayed timeline and by an adjustment factor to calculate a date change amount.

The zoom module 58 may include functionality for identifying whether the dragging corresponds to a zooming in or a zooming out based on the calculated distance change. The zoom module 58 may also include functionality for adjusting a start date and an end date of the displayed timeline by the calculated date change amount according to whether the dragging is identified as corresponding to the zooming in or the zooming out.

The timescale module 59 may include functionality for changing a timescale shown in the timeline displayed across the first dimension based on the adjusting of the start date and the end date.

The device 10 may contain a processing device 52, memory 53, and a communications device 54, all of which may be interconnected via a system bus. In various embodiments, the device 10 may have an architecture with modular hardware and/or software systems that include additional and/or different systems communicating through one or more networks via communications device 54.

Communications device 54 may enable connectivity between the processing devices 52 in the device 10 and other systems by encoding data to be sent from the processing device 52 to another system over a network and decoding data received from another system over the network for the processing device 52.

In an embodiment, memory 53 may contain different components for retrieving, presenting, changing, and saving data and may include computer readable media. Memory 53 may include a variety of memory devices, for example, Dynamic Random Access Memory (DRAM), Static RAM (SRAM), flash memory, cache memory, and other memory devices. Additionally, for example, memory 53 and processing device (s) 52 may be distributed across several different computers that collectively comprise a system. Memory 53 may be capable of storing user inputs and preferences as well as customized sequences.

In some instances, a cache in memory 53 may store calculated changes to the distance between the first point and the second point during the dragging of at least one of the points. Similarly, the memory 53 may be accessed to store parameters of the tilt and height module 56. The zoom module 58 may then adjust the start date and the end date of the calendar application only after a stored calculated change in the cache exceeds a threshold value.

Processing device 52 may perform computation and control functions of a system and comprises a suitable central processing unit (CPU). Processing device 52 may include a single integrated circuit, such as a microprocessing device, or may include any suitable number of integrated circuit devices and/or circuit boards working in cooperation to accomplish the functions of a processing device. Processing device 52 may execute computer programs, such as object-oriented computer programs, within memory 53.

The foregoing description has been presented for purposes of illustration and description. It is not exhaustive and does not limit embodiments of the invention to the precise forms disclosed. For example, although the processing device 52 is shown as separate from the modules 57 to 59 and the touch screen interface 11, in some instances the processing device 52 and the touch screen interface 11 and/or one or more of the modules 57 to 59 may be functionally integrated to perform their respective functions.

It will be apparent to those skilled in the art that various modifications and variations can be made in the method and device for time and timescale reset of the present invention without departing from the spirit or scope of the invention. Thus, it is intended that the present invention cover the modifications and variations of this invention provided they come within the scope of the appended claims and their equivalents.

We claim:

1. A method for navigating a calendar application hosted on a portable electronic device, the method comprising:

viewing a first timescale;
detecting a movement of the portable electronic device; and
upon detection of the movement, viewing a second timescale different from the first timescale,
wherein displayed content of a calendar entry varies in response the movement, the displayed content depending on the first timescale or the second timescale such that the displayed content includes statistical information of the calendar entry and a plurality of sub-activities if the second timescale is displayed, the displayed content further including a percent completion of each sub-activity.

2. The method according to claim 1, wherein the movement is a horizontal movement or tilt that corresponds to a change in time position.

3. The method according to claim 1, wherein the movement is a change in vertical position that corresponds to a change in timescale.

4. The method according to claim 1, wherein the movement is detected by a gyroscopic or other acceleration device.

5. The method according to claim 1, wherein the movement is measured and compared to a threshold such that the first or second time or the first or second timescale is only changed when the threshold is exceeded.

6. The method according to claim 1, wherein a shift factor is generated based on a measurement of the movement.

7. A portable electronic device comprising:
a calendar application operable to display a calendar application at a first timescale as well as a second timescale different from the first timescale; and
an input unit operable to detect a movement of the portable electronic device;
wherein the calendar application proceeds to the second timescale from the first timescale upon detection of the movement,
wherein displayed content of a calendar entry varies in response the movement, the displayed content depending on the first timescale or the second timescale such that the displayed content includes statistical information of the calendar entry and a plurality of sub-activities if the second timescale is displayed, the displayed content further including a percent completion of each sub-activity.

8. The portable electronic device according to claim 7, wherein the movement is a horizontal movement or tilt that corresponds to a change in time position.

9. The portable electronic device according to claim 7, wherein the movement is a change in vertical position that corresponds to a change in timescale.

10. The portable electronic device according to claim 7, wherein the movement is detected by a gyroscopic or other acceleration device.

11. The portable electronic device according to claim 7, wherein the movement is measured and compared to a threshold such that the first or second time or the first or second timescale is only changed when the threshold is exceeded.

12. The portable electronic device according to claim 7, wherein a shift factor is generated based on a measurement of the movement.

13. A non-transitory computer readable medium for navigating a calendar application hosted on a portable electronic device, the non-transitory computer readable medium having instructions for:
viewing a first timescale;
detecting a movement of the portable electronic device; and
upon detection of the movement, viewing a second timescale different from the first timescale,
wherein displayed content of a calendar entry varies in response the movement, the displayed content depending on the first timescale or the second timescale such that the displayed content includes statistical information of the calendar entry and a plurality of sub-activities if the second timescale is displayed, the displayed content further including a percent completion of each sub-activity.

14. The computer readable medium according to claim 13, wherein the movement is a horizontal movement or tilt that corresponds to a change in time position.

15. The computer readable medium according to claim 13, wherein the movement is a change in vertical position that corresponds to a change in timescale.

16. The computer readable medium according to claim 13, wherein the movement is detected by a gyroscopic or other acceleration device.

17. The computer readable medium according to claim 13, wherein the movement is measured and compared to a threshold such that the first or second time or the first or second timescale is only changed when the threshold is exceeded.

18. The computer readable medium according to claim 13, wherein a shift factor is generated based on a measurement of the movement.

19. A portable electronic device comprising:
a calendar application having a timescale module operable to display a calendar application at a first timescale as well as a second timescale different from first timescale, each of the first timescale and the second timescale having primary and secondary sub-timescales, the secondary timescale being more granular than the primary timescale; and
at least one of a gyroscopic and acceleration device operable to detect a movement of the portable electronic device, the touch screen unit being coupled to a position calculating module and a zoom module,
wherein the movement is measured and compared to a threshold such that the calendar application proceeds to second timescale from first timescale upon detection of the movement, and
wherein displayed content of a calendar entry varies in response the movement, the displayed content depending on the first timescale or the second timescale such that the displayed content includes statistical information of the calendar entry and a plurality of sub-activities if the second timescale is displayed, the displayed content further including a percent completion of each sub-activity.

20. The method according to claim 5, wherein the threshold is user-defined.

21. The method according to claim 5, wherein the threshold varies depending on a type of calendar entry.

* * * * *